United States Patent [19]

Pickens

[11] Patent Number: 5,255,572
[45] Date of Patent: Oct. 26, 1993

[54] VARIABLE STROKE MECHANISM

[76] Inventor: William C. Pickens, P.O. Box 177, Flagler, Colo. 80815

[21] Appl. No.: 850,102

[22] Filed: Mar. 12, 1992

[51] Int. Cl.$^5$ .................... F16H 35/08; F16H 21/20; F16H 55/17
[52] U.S. Cl. .................................. 74/522; 74/45; 74/109; 74/465; 74/559; 74/834; 123/78 E
[58] Field of Search ............... 74/45, 109, 119, 465, 74/522, 559, 834; 123/48 B, 78 E, 90.16; 251/234

[56] References Cited

U.S. PATENT DOCUMENTS

| 58,478 | 10/1866 | Reynolds | 74/522 |
|---|---|---|---|
| 273,276 | 3/1883 | Hawkinson | 74/522 |
| 841,601 | 1/1907 | Summers et al. | 74/522 X |
| 926,564 | 6/1909 | Hollopeter | 74/522 X |
| 1,189,312 | 7/1916 | Tibbels | 74/40 |
| 1,333,364 | 3/1920 | Albrook | 74/465 |
| 1,395,851 | 11/1921 | McLean | 123/90.16 |
| 1,909,372 | 5/1933 | McCollum | 123/48 B |
| 2,122,398 | 7/1938 | Harrison | 251/234 X |
| 2,357,031 | 8/1944 | Stabler | 123/51 |
| 2,398,640 | 4/1946 | Hickey | 123/48 B |
| 2,873,611 | 2/1959 | Biermann | 74/40 |
| 4,092,957 | 6/1978 | Tryhorn | 123/48 B |
| 4,841,799 | 6/1989 | Entzminger | 74/89.17 X |
| 4,917,066 | 4/1990 | Freudenstein | 123/48 B |

Primary Examiner—Allan D. Herrmann
Attorney, Agent, or Firm—Philip J. Lee

[57] ABSTRACT

A variable stroke mechanism provides a means for varying the stroke and leverage of a linkage between reciprocating power source and crankshaft. The mechanism includes a lever connected at one end to the reciprocating power source and at the other end to the crankshaft with a variable fulcrum point between the two ends. The lever forms a longitudinally extending slot for containing a fulcrum member, the other surfaces of which, while generally cylindrical, secures a series of parallel and equiangularly displaced cylindrical roller bearings. The top of the slot formed within the lever is a flat bearing surface and the opposing bottom surface contains a series of semicircular channels forming a gear train sized and located to successively engage the roller bearings on the fulcrum member and said bearings serving as gear teeth such that rotation of the fulcrum member changes the position of the fulcrum point relative to the lever. The mechanism may be repeated as necessary in a multi-piston engine with the relative positions of the flat raced surface and the gear train race surface being reversed in the case of opposing pistons utilizing a single control shaft with common rotation of all fulcrum members. Rotation of the fulcrum member and movement of the pivot point can be controlled by a self-braking servo-motor with appropriate worm gear drive.

14 Claims, 3 Drawing Sheets

VARIABLE STROKE MECHANISM

BACKGROUND OF THE INVENTION

A. Field of Invention

The present invention relates generally to linkage mechanisms for power transfer from a reciprocating power source to a crankshaft, and more particularly to a new and improved means for varying the stroke and power output of a reciprocating power source.

B. Description Of Related Art

In engines with one or more sources of reciprocating power, the power source is frequently a piston and it is frequently desireable to translate the linear motion of the piston and piston rod to the rotary motion of a crankshaft. When the piston rod or pitman directly attaches the piston to the crankshaft, there is little or no possibility of varying the travel range or stroke of a piston nor any way of changing the mechanical advantage between the piston and the crankshaft. Both the piston stroke and the mechanical advantage may be accomplished by means of a linkage arrangement between the power source and the crankshaft. In order to provide a variation in the stroke or in the power output, a pivoting lever sometimes called sway bar, swing beam or rocker beam may be interposed between the piston rod and the crankshaft. The resulting lever system may provide a means for varying the stroke and thereby changing the compression ratio and/or power output by varying the location of the fulcrum point along the rocker beam. Examples of such mechanisms are shown in U.S. Pat. No. 1,189,312 to Tibbels and in U.S. Pat. No. 2,873,611 to Biermann. These patented devices for varying the fulcrum point all rely on an external means, for example, a lever for locating a pivotable slide or cage that may be fixed or partially fixed relative to the piston and crankshaft but is not positively located in a fixed location on the rocker beam itself. As a result, the rocker beam is free to move within the cage or slide and the strain borne by the fulcrum is transferred and borne to the end of the lever controlling the position of the fulcrum. In such systems, the variability of the location of the fulcrum point on the rocker beam would be expected to cause difficulty in attempting accurate control of the stroke and mechanical advantage. In addition, location of the fulcrum point at the end of a lever would significantly increase the force on the mechanism used to control the fulcrum point. Nor are such mechanisms readily and efficiently adapted for use in a multiple piston engine where common and precise control is advantageous.

SUMMARY OF THE INVENTION

The present invention seeks to adjust the fulcrum point of the rocker beam in a manner that can be precisely controlled due to the positively and relatively precisely controllable location of the pivot point on the rocker beam. In the present invention the rocker beam member includes an internal longitudinally elongated slot that transversely passes through the beam. The rocker beam member is formed of opposing plates, with each being at one end adapted for connection to a crankshaft and at the opposing end adapted for connection to a piston rod. The rocker member in most applications will be connected to the crankshaft by means of a connecting rod. The centrally located slot traverses through both panels and has a top side defined as being the side on which the piston is located. The slot has a wall in the general shape of a flattened tube. The top of the slot is wall lined with a smooth, flat, anti-friction bearing plate and the bottom side of the slot comprises a series of equally spaced parallel grooves of semi-circular cross section set normal to the side panel faces to form a flat gear train. The mid-line of the slot is not parallel to a line between the connecting ends of the rocker member, but is at an acute angle to the line between the rocker member ends. The slot is generally perpendicular to the piston rod when the piston is at its highest position with minimum clearance to the top of the cylinder, and the crankshaft end is at its lowest point.

The present invention comprises a generally cylindrical fulcrum member the radially outer surface of which contains and secures a series of cylindrical, roller type bearings partially received within a series of semi-circular grooves. The roller bearings are parallel to each other and are equi-angularly displaced about the axis of the fulcrum member and a central shaft on which the fulcrum member is fixed. The grooves on the fulcrum member and the grooves on the gear train are both sized to partially receive the roller bearings and to secure said bearings against rotation about the axis of the shaft and against lateral movement with respect to the gear train. The roller bearings protrude beyond the surface of the fulcrum member which therefore is able to function as a gear. The fulcrum member is received within the slot such that the roller bearings will successively and releasably engage the gear train when the shaft is rotated. The anti-friction bearing plate at the top of the slot allows the fulcrum member to be rotated within the slot, thereby securely and variably fixing the location of the fulcrum member with respect to the rocker beam. The location of the shaft relative to the piston, cylinder and crankshaft is fixed and adequately supported in a conventional manner. Upon rotation of the shaft, the rocker member moves relative to the fulcrum member to establish a different pivot point.

The angle of the slot allows the maintenance of a constant clearance between the piston head and the top of the cylinder which would otherwise change with the variation in the distance between the pivot point and the piston connecting end. The degree of the slot angle is dependent upon the length of the piston rod and the length of the slot and is set to be horizontal (perpendicular to the axis of the piston cylinder) when the piston is at its maximum height and closest to the top of the cylinder. The axis of the shaft is on the line between the connecting ends when the fulcrum member is at the piston end of the race, and is above the line between the connecting ends when the fulcrum member is at the crankshaft end of the race.

The rotation of the shaft is controlled by a controllable worm gear or other servo-mechanism which may be electronically controlled and which is preferably self-braking and restrained by an automatic braking or locking mechanism. Sliding covers on both sides of the slot protect against damage or jamming caused by the introduction of foreign particles and serve to retain oil or other substance used to lubricate the roller bearings. Forming the shaft of a tube communicating with an oil source and having an oil hole close to the roller bearings provides a means to keep the bearings lubricated.

It is expected that the shaft itself will be supported by bearings and would, at appropriate intervals, have repeated fulcrum members as necessary depending upon the number of cylinders. Engines having cylinders and pistons in opposition would require either tandem shafts which will rotate in opposing directions or a single shaft which could be used if the relative positions of the gear train and bearing plate were reversed for the opposing cylinders.

The purpose and intent of the present invention is to provide a new and improved method of varying the stroke of a reciprocating power source while transmitting said power to a crankshaft to produce rotational torque.

Another and further purpose and intent of the present invention is to provide a new and improved method of varying the mechanical advantage and power output of a linkage transmitting said power from a reciprocating power source to a crankshaft to produce rotational torque.

Other objects and advantages of the invention will become apparent from the Description of the Preferred Embodiment and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 1:
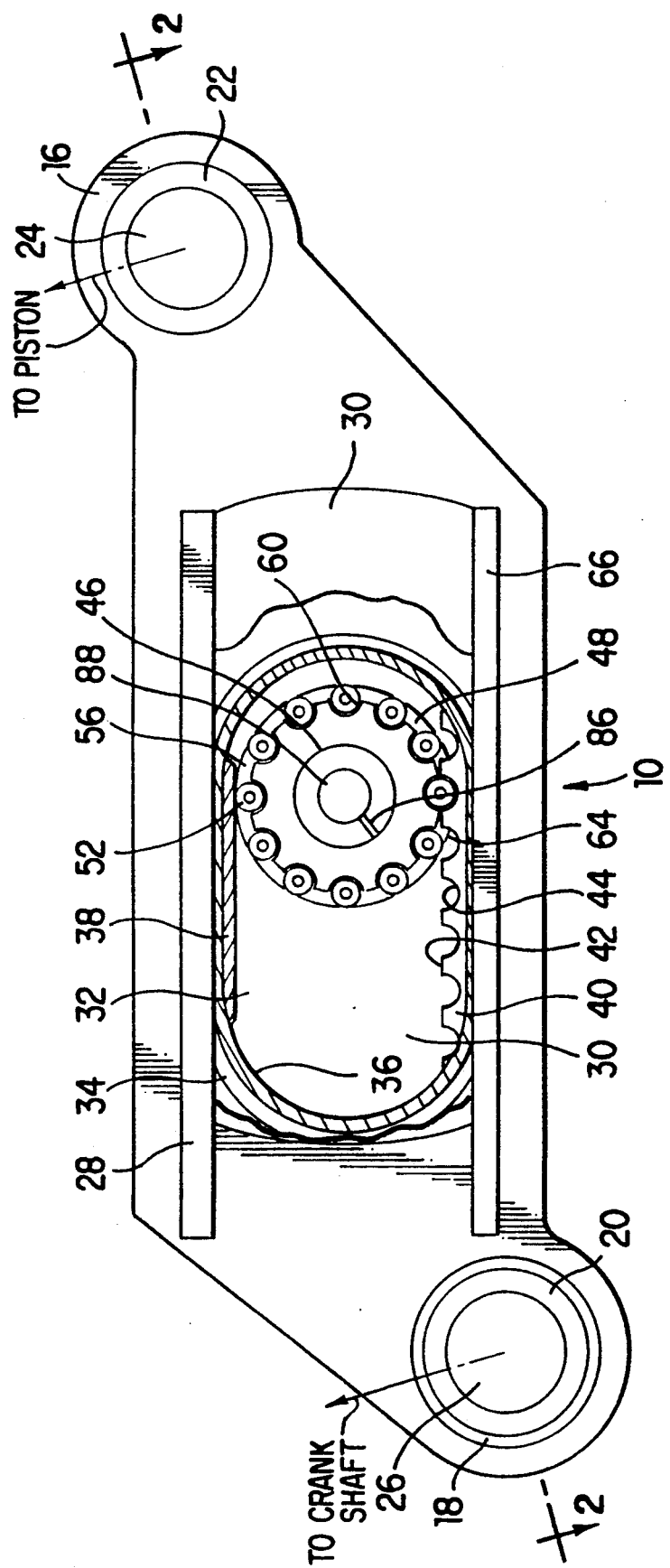
FIG. 1 is a front view of a preferred embodiment of a device constructed in accordance with the present invention, showing the unconnected device with cover 30 partially cut away.
Figure 2:
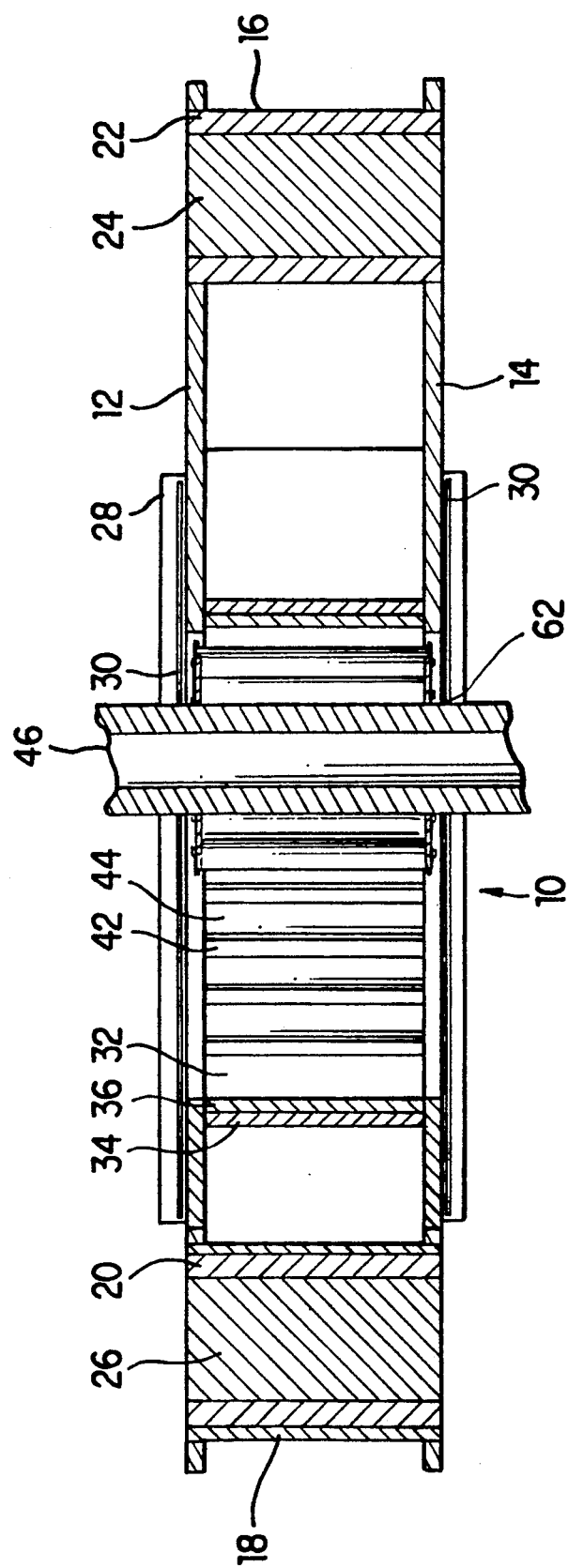
FIG. 2 is a top section view of a preferred embodiment of a device constructed in accordance with the present invention, taken through the plane of line 2—2 as shown in FIG. 1, showing the unconnected device.

With reference to the Drawings wherein like numerals represent like parts throughout the figures, a variable stroke mechanism in accordance with the present invention is generally designated by the numeral 10 in FIG. 1. The illustrated preferred embodiment of mechanism 10 includes two elongated plates connected at the middle and at the ends as hereinafter described. For the ease of description, the embodiment illustrated in FIG. 1 and FIG. 2 will be described as having a front and back, top and bottom, left and right, all of which directions shall be with reference to FIG. 1, said figure being a frontal view. The top of mechanism 10 in most applications would be the side toward the piston or reciprocating power source and exposed to greater force in the relatively downward direction. The aforementioned plates therefore consist of a front plate 12 and a back plate 14 which are mirror images of each other.

Both front and back plates 12 and 14 have a crankshaft end 18 shown as the left side on FIG. 1 and a piston end 16 shown as the right side on FIG. 1. At crankshaft end 18, both front and back plates 12 and 14 are traversed and connected by a cylindrical bushing 20 for receiving a connecting pin 26 for securing a linkage or other connection (not shown) to a crankshaft or other power output means. At piston end 16, both front and back plates 12 and 14 are traversed and connected by a cylindrical bushing 22 for receiving and connecting pin 24 or other pivotable attachments to a piston rod or pitman (not shown) connecting to a piston or other reciprocating power source (also not shown). Intermediate between piston end 16 and crankshaft end 18, both plates 12 and 14 are traversed by a slot 32 formed of an outer surface 34 and inner surface 36, both of which are in the shape of a vertically flattened and horizontally widened tube such that the top and bottom portions of slot 32 are flat while the left and right ends of slot 32 are cylindrically curved. Slot surfaces 34 and 36 are attached to both front and back plates 12 and 14. The central axis of slot 32 is normal to the front and back plates 12 and 14 and the direction in which slot 32 is symmetrically elongated and the planes of the flattened portions of the top and bottom of the slot 32 are parallel to each other and at an angle to the line between the axis of connecting pins 24 and 26 at the ends 16 and 18 of the mechanism 10. The top portion of inner surface 36 of slot 32 is lined by a flat bearing plate 38. Bearing plate 38 is formed of a suitably durable materials with as low a coefficient of friction as is consistent with the durability and hardness required for plate 38 to reliably function as hereinafter described. The bottom portion of inner surface 36 of slot 32 is lined by a flat gear train 40. The inside surface of gear train 40 comprises a series of parallel, equally spaced semi-circular channels 44 running from front to back, normal to the front and back plates 12 and 14 and mechanism 10 as a whole. Channels 44 are sufficiently spaced to provide equally spaced raised sections 42 which serve as gear teeth. The outer surfaces of both the front plate 12 and the back plate 14 each additionally comprise opposing top rails 28 and bottom rails 66. The top rails 28 are parallel to and above (lateral to) the bearing plate 38 and the bottom rails 66 are parallel to and below (lateral to) the gear train 40. Rails 28 and 66 extend outward from the surface of plates 12 and 14 in the shape of opposing "L" shapes and are formed to laterally guide and retain flat, sliding covers 30 which cover the opening of slot 32 at both the front and back to protect against the entrance of foreign objects and to retain oil or other lubricating substance.

A central shaft 46 generally traverses the mechanism 10 at an angle normal to the front and back plates 12 and 14 and parallel to the connecting pin 24 and crankshaft connection 26. Central shaft 46 rotatably extends through an opening 62 in one cover 30, traverses the front and back plates 12 and 14 through the race 32 and exits through another opening 62 in the second cover 30. A fulcrum member 48 is rotationally fixed on shaft 46 between the covers 30 and within the slot 32 and is of overall generally cylindrical configuration, coaxial with shaft 46. The outer surface of fulcrum member 48 is shaped to form a series of parallel equi-angularly displaced semi-circular channels 60 parallel to the shaft 46. Channels 60 are similar shape, dimension and spacing as gear train channels 44. Both front and back ends of fulcrum member 48 additionally comprise radially extending flanges 56, the outer surface of which includes an inward facing lip 64. A series of cylindrical roller bearing members 52 are installed in the channels 60 and retained by flange 56 and lip 64. Each roller bearings 52 is fixed in place additionally by a central pin that is rotatably received at both ends in a hole in the flanges 56. Roller bearings 52 are cylindrically shaped of a radius only slightly less than the radius of channels 60 and 44 and of a length slightly longer than the depth of both Plate 38 and gear train 40. Upon installation of mechanism 10 the fulcrum member 48 is affixed to shaft 46 and inserted into slot 32 such that roller bearings 52 roll freely along flat bearing plate 38 and successively are received by gear train channels 44 and engage teeth 42 fulcrum member 48 and slot 32 are sized to allow sufficient clearance for the installed fulcrum member 48 to rotate but within a small enough tolerance that the rollers 52 cannot jump out of channels 44. Upon rotation of shaft 46 relative to mechanism 10 the engagement of the rollers 52 with gear train 40 cause the location of fulcrum member 48 between piston end 16 and crankshaft end 18 to be changed. The race 32 is enclosed by means of slide 30 closely fitted to shafts 46 and sliding on rails 28 and 66. In the illustrated preferred embodiment, shaft 46 is formed of a relatively thick walled tube with a central bore 88 and openings 86 in the vicinity of the interior of fulcrum member 48 thereby providing a means for introducing oil or an other lubricating substance into the interior of fulcrum member 48 for the lubrication of the roller bearings and mechanism 10 in general.

The connection of a piston rod or pitman or other reciprocating power source linkage to piston end 16, will cause mechanism 10 to pivot upon fulcrum member 48 so as to cause the movement of crankshaft end 18. The range of motion or stroke of crankshaft end 18 may be controlled by the configuration of the linkage to the crankshaft itself (not shown) while the range of motion or stroke of the piston or other reciprocating power source is controlled by the location of the fulcrum member 48 relative to the piston end 16 and crankshaft end 18. By rotating shaft 46, the location of the fulcrum member 48 and thus the pivot point of the mechanism 10 as a whole is changed and the relative leverage and mechanical advantage is accordingly altered thereby changing the stroke of the reciprocating power source and altering the force communicated to the crankshaft end 18.

Figure 3:
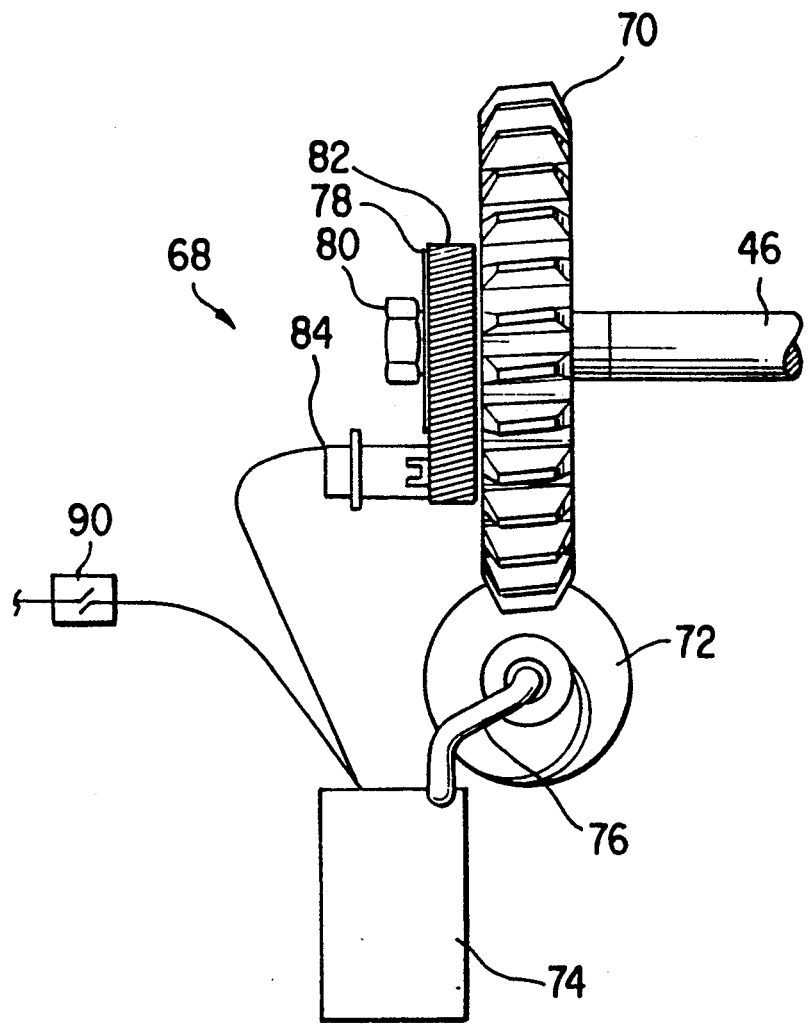
FIG. 3 is a schematic drawing of a control mechanism for the preferred embodiment of a device constructed in accordance with the present invention.

A means for controllably rotating shaft 46 is shown in FIG. 3 generally comprising a electronically controlled and locking worm gear drive 68. Drive mechanism 68 comprises a worm wheel 70, and a worm driver 72. The worm wheel 70 is fixedly mounted on and coaxial with shaft 46 and the axis of the worm driver 72 is normal to the axis of the worm wheel 70 and shaft 46. Worm driver 72 is driven by electric motor 74 by means of a drive shaft 76. A brake drum 78 is affixed to the outer end of shaft 46 by means of a nut 80 and is generally cylindrical and coaxial with shaft 46. A brake band 82 surrounds brake drum 78 and an electricly controlled brake unit 84 that is capable of alternately locking and releasing the brake band 82. Brake unit 84 and motor 74 are subject to control by electronic control unit 90 to work with each other and not in opposition. By operation of worm gear drive 68, the shaft 46 can be controllably rotated, thus causing the mechanism 10 to move relative to shaft 46, thereby altering the position of the pivot point of mechanism 10 and the leverage of the linkage between the power source and the crank shaft. It will be appreciated that a number of servo-mechanisms may be anticipated to controllably rotate shaft 46 in ways other than those illustrated in FIG. 3.

The angle between the line connecting the axis of the connecting pins 24 and 26 and the planes of the top bearing plate 38 and the gear train 40 is determined by the desirability of maintaining constant clearance between the piston head and the top of the cylinder. In the event, as is often the case, it is desired that the maximum upward travel or height of pin 24 at piston end 16, remains constant, then, in the preferred embodiment, the slot 32 must be positioned so that the bearing plate 38 is essentially normal to the axis of the piston and cylinder when the crankshaft end 18 is at its lowest position, i.e. farthest from the central axis of the crankshaft and piston end 16 is in its highest position, i.e. closest to the top of the cylinder at the point of maximum height of the piston. At the point of maximum height, the bearing plate 38 and slot 32 generally may be inclined at an angle slightly less or greater than 90 degrees to the axis of the piston to offset the slight change in the height of the bottom end of the piston rod upon its being displaced from the axis of the piston when the mechanism 10 is shifted toward or away from the piston. The adjustment of the exact angle of slot 32 will depend upon the placement, orientation and length of the piston and piston rod. The affect of the displacement of the piston rod end may be minimized by positioning the slot 32 such that the piston rod is coaxial with the cylinder when the fulcrum member 48 is at the center of slot 32.

In multiple power source engines such as multiple piston engines, the shaft 46 will have repeated fulcrum members at appropriate intervals as necessary depending upon the number of cylinders. Engines having power sources or pistons in opposition could utilize two shafts 46, which will rotate in opposing directions. Alternatively, a single shaft 46 might be used if the relative positions of the gear train 40 and bearing plate 38 were reversed for one set of opposing cylinders.

It should be anticipated that the features of mechanism 10, while specifically designed for use as a means for connecting a piston to a crankshaft, could be modified for use in other similar connections. Similarly, other means for connecting connector 10 to a variety of alternative power sources could be anticipated.

It should be further understood and anticipated that numerous materials could be utilized for the components of mechanism 10 provided the overall strength of the mechanism is sufficient to withstand the considerable forces to be anticipated in an internal combustion engine and provided bearing plate 38 is relatively durable. It is also to be recognized that bearing plate 38 and roller bearings 52 will be subject to substantial compressive force and should be formed of compatible materials so as not to bind or gall or otherwise break down while in use.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A mechanism for transferring power from a reciprocating power source to a power output device, the mechanism comprising a connecting member with a first end and a second end, a top, a bottom, and a central portion between the first and second ends that is adapted to receive a fulcrum member about which the connecting member is pivotable, said fulcrum member being secured in a fixed position, adjusting means for variably adjusting the position of the connecting member with respect to the fulcrum member, and travel limiting means for maintaining a constant limit of travel in one direction of the first end of the connecting member when the travel distance and limits of travel of the second end remain constant while the position of the connecting member with respect to the fulcrum member is varied.

2. The device of claim 1 wherein the adjusting means comprises a gear wheel section of the fulcrum member and a slot traversing the connecting member and capable of receiving the gear wheel section of the fulcrum member, said slot having a smooth top and a bottom shaped to form a train of gear teeth engageable with the teeth of the gear wheel section of the fulcrum member.

3. The device of claim 2 wherein the travel limiting means comprises the angle of the slot relative to an axis through the first and second ends, the angle of the slot from the end nearest the second connecting member end to the end nearest the first connecting member end being opposite to the direction in which travel of the first end is to be limited, whereby the slope of the slot relative to said axis is negative if upward travel is to be limited and positive when downward travel is to be limited.

4. The device of claim 3 wherein the first connecting member end travels along an arc and the magnitude of the angle of the slot relative to said axis through the first and second connecting member ends is such that when the first connecting member end has reached the limit of its travel in the direction in which travel is to be limited, the slot is approximately normal to the chord of said arc.

5. The device of claim 4 wherein the fulcrum member is controllably rotatable and the rotation of the fulcrum member changes the location of the pivot point of the connecting means.

6. The device of claim 5 wherein the gear wheel section of the fulcrum member further comprises a generally cylindrical outer surface formed with a plurality of equi-angularly displaced semi-circular channels each of which receives a cylindrical roller bearing that are parallel to each other and serve as gear teeth and the connecting member train of gear teeth comprises a series of parallel semi-circular channels shaped to receive the roller bearings of the fulcrum member.

7. The device of claim 6 wherein the fulcrum member is fixed to a rotatable shaft, the rotation of which is controlled by a motor and brake mechanism.

8. A mechanism for transferring power from a reciprocating power source to a power output device, the mechanism comprising a connecting member with a first end for connection to a power source and a second end for connection to a power output device, a top, a bottom, and a central portion between the first and second ends that is adapted to receive a fulcrum member about which the connecting member is pivotable, said fulcrum member being secured in a fixed position, adjusting means for variably adjusting the position of the connecting member with respect to the fulcrum member, and travel limiting means for maintaining a constant upper limit of travel of the first end of the connecting member when the travel distance and upper and lower travel limits of the second end are constant while the position of the connecting member with respect to the fulcrum member is varied.

9. The device of claim 8 wherein the adjusting means comprises a gear wheel section of the fulcrum member and a slot traversing the connecting member and being capable of receiving the gear wheel section of the fulcrum member, said slot having a smooth top and a bottom shaped to form a train of gear teeth engageable with the teeth of the gear wheel section of the fulcrum member.

10. The device of claim 9 wherein the travel limiting means comprises the angle of the slot relative to an axis through the first and second connecting member ends, the slope of the slot relative to said axis being negative and downward toward the bottom of the connecting member from a slot end closest to the connecting member second end to the slot end closest to the connecting member first end.

11. The device of claim 10 wherein the first connecting member end travels along an arc and the magnitude of the angle of the slot relative to said axis through the first and second connecting member ends is such that when the first connecting member end has reached the upper limit of its travel, the slot is approximately normal to the chord of said arc.

12. The device of claim 11 wherein the fulcrum member is controllably rotatable and the rotation of the fulcrum member changes the location of the pivot point of the connecting means.

13. The device of claim 12 wherein the gear wheel section of the fulcrum member further comprises a generally cylindrical outer surface formed with a plurality of equi-angularly displaced semi-circular channels each of which receives a cylindrical roller bearing that are parallel to each other and serve as gear teeth and the connecting member train of gear teeth comprises a series of parallel semi-circular channels shaped to receive the roller bearings of the fulcrum member.

14. The device of claim 13 wherein the fulcrum member is fixed to a rotatable shaft, the rotation of which is controlled by a motor and brake mechanism.

* * * * *